United States Patent [19]

Dennis

[11] Patent Number: 4,656,689

[45] Date of Patent: Apr. 14, 1987

[54] GROMMET

[75] Inventor: Frank S. Dennis, Fort Worth, Tex.

[73] Assignee: Molded Products Company, Fort Worth, Tex.

[21] Appl. No.: 846,760

[22] Filed: Apr. 1, 1986

[51] Int. Cl.$^4$ .............................................. B65D 55/00
[52] U.S. Cl. ................................... 16/2; 174/153 G; 248/56
[58] Field of Search ................. 16/2; 248/56; 24/141, 24/142; 403/50; 174/65 G, 152 G, 153 G; 277/178

[56] References Cited

U.S. PATENT DOCUMENTS

| 2,663,895 | 12/1953 | Petri ........................................ 24/141 |
| 3,518,359 | 6/1970 | Trimble et al. ......................... 248/56 |
| 3,894,782 | 7/1975 | Hug ........................................ 248/56 |
| 4,137,602 | 2/1979 | Klumpp ................................... 16/2 |
| 4,517,408 | 5/1985 | Pegram ............................. 174/153 G |

Primary Examiner—M. Jordan
Attorney, Agent, or Firm—Wm. T. Wofford; James C. Fails; Arthur F. Zobal

[57] ABSTRACT

There is disclosed an easy to install grommet device for protecting conduit passing through a wall opening and for providing an air seal between the conduit and the edge of the wall around the wall opening. The grommet device has a relatively stiff fastener portion with projections extending therefrom and locking devices at the ends of the projections for engaging the edges of the wall around the wall opening. An elastomeric seal portion receives the projections and has an aperture of smaller dimensions than the outside dimensions of the conduit.

8 Claims, 9 Drawing Figures

U.S. Patent  Apr. 14, 1987  Sheet 1 of 2  4,656,689
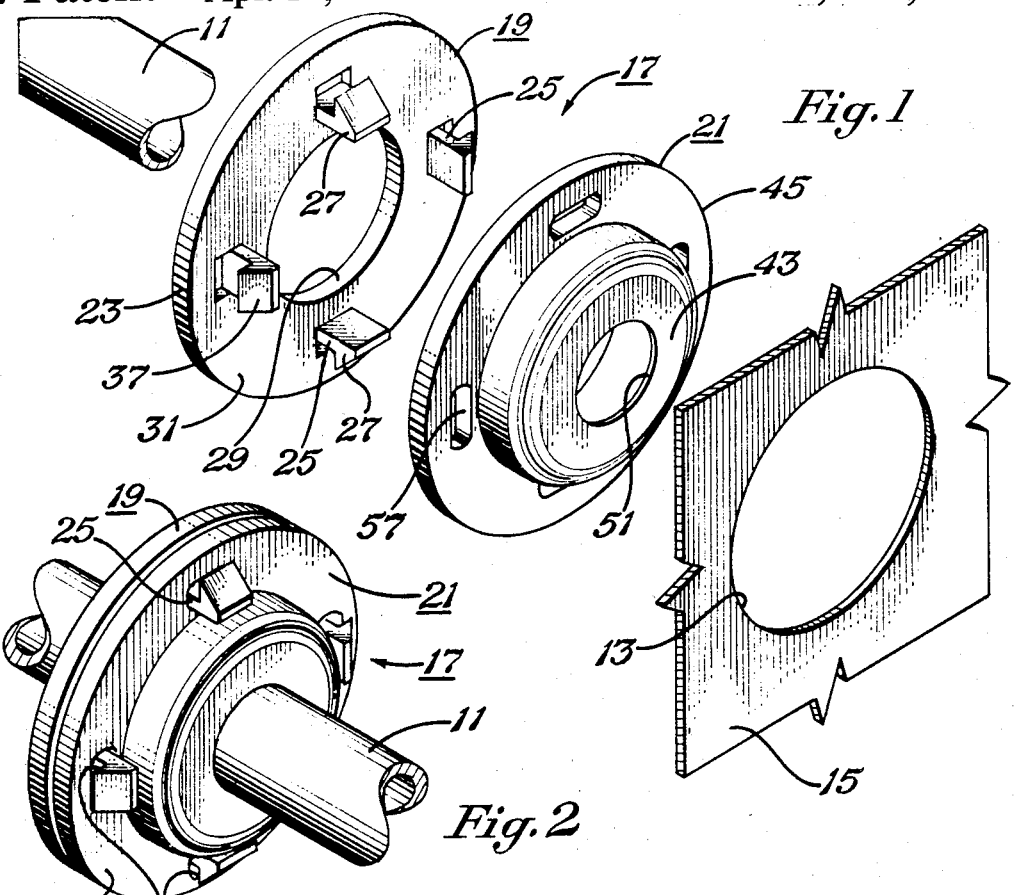
Fig.1
Fig.2
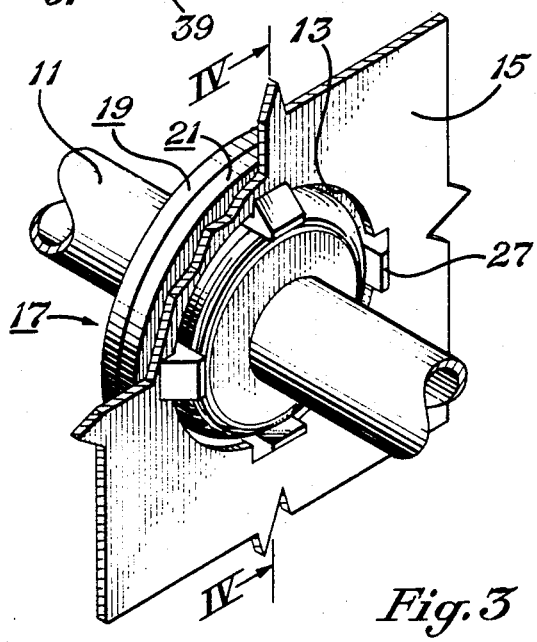
Fig.3
Fig.4

U.S. Patent   Apr. 14, 1987   Sheet 2 of 2   4,656,689
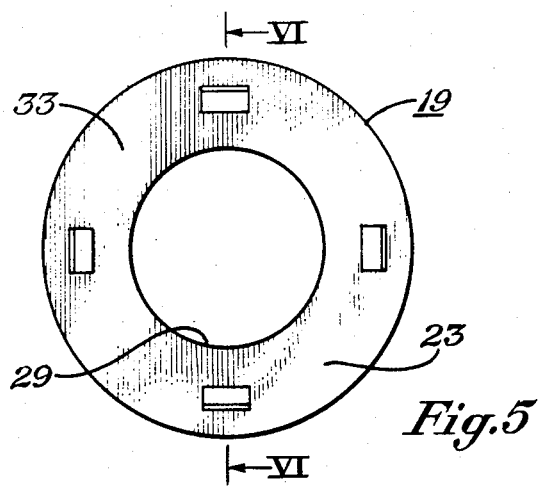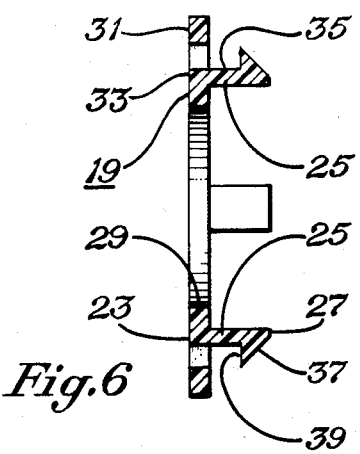
Fig.5  Fig.6
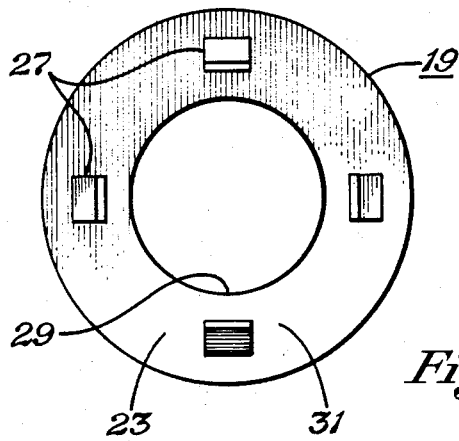
Fig.7
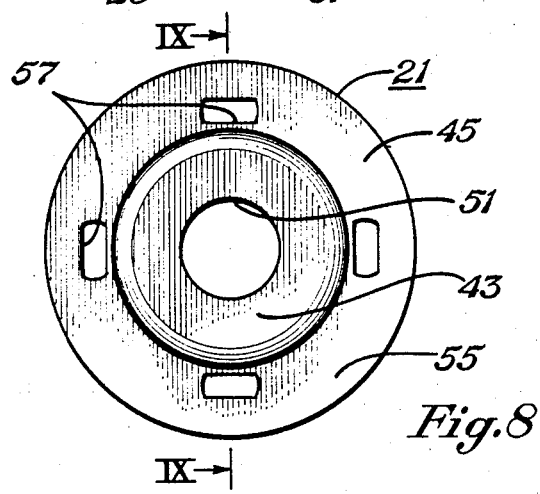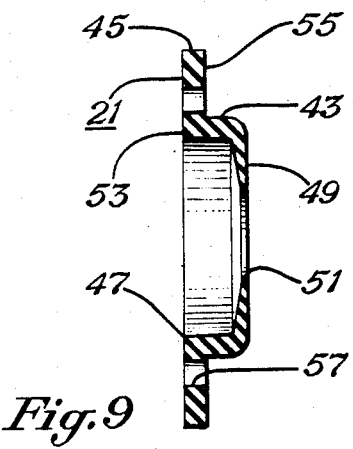
Fig.8  Fig.9

GROMMET

FIELD OF THE INVENTION

The present invention relates to grommets of the type used in connection with certain types of conduits passing through walls, partitions, enclosures and the like.

BACKGROUND OF THE INVENTION

Although many automotive air conditioning systems are installed at the factory, a considerable number of such systems are installed in the automotive aftermarket. Installation of an air conditioning system in an automobile becomes much more difficult once the automobile has left the factory. Part of the difficulty arises from the installation of refrigerant lines. In an automotive air conditioning system the refrigerant lines connect a compressor located in the automobile's engine compartment with an evaporator located in the passenger compartment. The refrigerant lines, usually in the form of rubber covered high pressure conduit, pass through openings in the firewall which separates the engine compartment from the passenger compartment. The refrigerant lines are protected from abrasion resulting from contact with the edges of the firewall openings by grommets that line the openings. In addition, the grommets provide an air seal around the refrigerant lines.

The grommet commonly heretofore used is a single piece rubber grommet. Such grommet has a peripheral slot which is used to engage the firewall, and a central opening through which conduit is passed. Engaging the firewall into the peripheral slot is a task normally accomplished with both hands and a screwdriver. Installation of this prior art grommet in close quarters, which is usually the case in an automotive installation, is frustratingly difficult.

The objective of the present invention is to provide an improved grommet device that is effective and easy to install, even in close quarters.

BRIEF DESCRIPTION OF DRAWINGS

FIG. 1 is a schematic isometric view showing the grommet device of the present invention, in accordance with a preferred embodiment, in a disassembled arrangement.

FIG. 2 is a schematic isometric view showing the grommet device of FIG. 1, in an assembled arrangement.

FIG. 3 is a schematic isometric view showing the grommet device of FIGS. 1 and 2 in an assembled installed arrangement.

FIG. 4 is a schematic longitudinal section view taken at lines IV—IV of FIG. 3.

FIG. 5 is a schematic plan view showing the outer side of the fastener portion.

FIG. 6 is a schematic longitudinal section view taken at lines VI—VI of FIG. 5.

FIG. 7 is a schematic plan view showing the inner side of the fastener portion.

FIG. 8 is a schematic plan view showing the inner side of the sealer portion.

FIG. 9 is a schematic longitudinal section view taken at lines IX—IX of FIG. 8.

DESCRIPTION OF A PREFERRED EMBODIMENT

Referring now to the drawings, particularly FIGS. 1-4, in an automotive air conditioning system, a refrigerant line or conduit 11 passes through an opening 13 in the firewall 15 from the outer engine compartment to the inner passenger compartment. The grommet device 17 of the present invention can be used to protect the conduit 11 from contacting the edges of the firewall opening 13 and to provide an air seal around the conduit. The grommet device 17 is made up of two parts, one of which is a fastener portion 19 and the other of which is a seal portion 21.

The fastener portion 19 includes a base portion 23, a plurality of projections 25, and locking means 27, all integrally formed together (see FIGS. 5-7). The base portion 23 is washer shaped, having a centrally located circular opening 29, an inner surface 31, and an outer surface 33. The base portion opening 29 is of a sufficiently large diameter to allow the passage of the conduit 11 through the fastener portion 19 via the base portion opening. In addition, the base portion opening 29 is of a sufficiently small diameter to prevent the conduit from contacting the wall 15 at the wall opening 13 (see FIG. 4). The projections 25 protrude perpendicularly outward from the base portion inner surface 31. The projections 25 are disposed around the base portion opening 29 at 90° intervals and at equal radial distances from the base opening center. Each projection 25 is of a rectangular transverse cross section having a much smaller radial dimension than the circumferential dimension. This dimensional configuration enables the projections 25 to be bent radially inward during the installation process, as is hereinafter more fully explained. In addition each projection 25 has an outboard surface 35.

Locking means 27 are disposed at the ends of the projections 25. In the preferred embodiment, the locking means are locking tabs 27. Each locking tab 27 has an inclined surface 37 and a shoulder surface 39. The locking tab inclined surfaces 37 slope towards the base portion inner surface 31 and face outwardly. The shoulder surfaces 39 are parallel to the base portion inner surface 31 and merge with the respective locking tab inclined surfaces 37 along one edge and with the respective projection outboard surfaces 35 along the opposite edge.

The fastener portion 19 is made of a relatively stiff material such that the projections 25 remain perpendicularly disposed to the base portion inner surface 31 until bent radially inward during the installation of the grommet device 17 relative to the wall opening 13, and having some resilience such that the projections resume their perpendicular dispositions when the grommet device is installed. A material suitable for fabricating the fastener portion 19 would be Teflon.

The seal portion 21 is made of elastomeric material and includes a pan 43 and a flange 45 (see FIGS. 8 and 9). The length of the circular pan 43 is at least equal to the length of the projections 25. The pan 43 also has an open end 47 and a partially closed end 49. The partially closed end 49 of the pan has a centrally located circular aperture 51, the diameter of which is slightly less than the outside diameter of the conduit 11. The inside diameter of the pan 43 is subjected to the same limitations as is the diameter of the base portion opening 29; that is, the inside diameter of the pan is sufficiently large enough to allow the passage of the conduit 11 but is sufficiently small enough to prevent the conduit from contacting the wall 15 at the wall opening 13. Thus in a preferred embodiment, the inside diameter of the pan 43 is approximately the same as the diameter of the fastener opening 29. The washer shaped flange 45 rims the open end 47 of the pan and extends radially outward. The outside diameter of the flange 45 is approximately the same as the outside diameter of the fastener portion base portion 23. An outer surface 53 is created by the flange 45 and the open end 47 of the pan. The inner surface 55 of the flange merges with the exterior surface of the pan 43. The flange 45 has a plurality of openings 57 that are appropriately positioned both radially and circumferentially, to receive the projections 25 when the grommet device 17 is assembled. Each seal portion opening 57 is only slightly larger than the transverse cross sectional area of each projection 25. The thickness of the flange 45 is less than the length of the fastener portion projections 25 thus allowing the projections to extend past the flange when the seal portion 21 is assembled onto the fastener portion.

Referring now particularly to FIGS. 1-4, the assembly and installation of the grommet device 17 of the present invention will be described. First, an opening 13 in the wall 15 is made. The diameter of the opening 13 is approximately the same as the diameter of a circle which circumscribes the outboard surfaces 35 of the projections 25. In addition, the wall opening 13 diameter is smaller than the diameter of a circle which circumscribes the outboard edges of the locking tabs (see FIG. 4). Next, the seal portion 21 is positioned relative to the fastener portion 19 such that the outer surface 53 of the seal portion faces the inner surface 31 of the fastener portion (see FIG. 1). The seal portion openings 57 are then aligned with the fastener portion projections 25 and the seal portion 21 is pushed onto the fastener portion 19, thereby pushing the locking tabs 27 through the openings 57. When the grommet device 17 is assembled, the locking tab shoulder surfaces 39 face the seal portion inner surface 55 (see FIG. 2).

Next, the grommet device 17 is installed onto the conduit 11 by sliding the conduit through the seal portion aperture 51 as shown in FIG. 2. The conduit 11 is inserted through the wall opening 13 and the grommet device 17 is placed up against the edge of the wall opening such that all of the inclined surfaces 37 of the projections contact the wall at the opening. Force is applied to the fastener portion outer surface 33 causing the projections 25 to bend radially inward and allowing the locking tabs 27 to pass through the wall opening 13. Once the grommet device 17 is installed relative to the wall opening 13, portions of the wall 15 around the wall opening 13 abut those portions of the projections 25 that extend beyond the seal portion flange 45, thereby preventing radial movement of the grommet device. Portions of the seal portion flange 45 and the wall opening edges are clamped between the base portion inner surface 31 and the locking tab shoulder surfaces 39, thereby preventing longitudinal movement of the grommet device 17.

A grommet device made in accordance with the present invention is effective and easier to install than the grommets of the prior art.

An important aspect of the present invention is the incorporation of relatively stiff projections 25 and the associated locking means 27 into the grommet device, thus enabling the installation of the grommet device by relatively simple methods. Installation of the gromme device can be easily achieved by holding the grommet device in one hand, aligning the device relative to the wall opening, and then with the same hand pushing the projections into the wall opening.

Depending upon the type of locking means 27 used, the length of the projections 25 need only be the same as the thickness of the seal portion flange 45 such that the locking means extend beyond the seal portion flange. The projections can be longer than the thickness of the seal portion flange, as in the embodiment described herein, such that the wall around the wall opening abuts the projections.

Another aspect of the present invention is that the grommet device protects the conduit from abrasion by preventing the conduit from contacting the edge of the wall opening. The conduit passes through the base portion opening 29 and the seal portion pan 43. The diameter of the base portion opening and the internal diameter of the seal portion pan are less than the diameter of the wall opening. Although the conduit is prevented from contacting the edge of the wall opening by both the fastener portion and the seal portion, the fastener portion may constrain the radial movement of the conduit without assistance from the seal portion and vice-versa. As additional protection for the conduit, the seal portion pan actually passes through the wall opening when the grommet device is installed.

Another aspect of the present invention is that the grommet device provides an air seal around the conduit at the wall opening. The elastomeric seal portion is provided with an aperture 51 of a smaller diameter than the outside diameter of the conduit. Thus, when the conduit 11 is inserted through the aperture, the aperture must stretch to open to a larger diameter, ensuring a seal around the outside diameter of the conduit. In addition, an air seal is provided between the seal portion and the wall when the seal portion flange 45 is pressed up against the wall around the wall opening by the fastener portion. Although the seal portion openings 57 may be as large as notches in the seal portion flange 45, by limiting the seal portion openings to a size that is only slightly larger than the transverse cross sectional area of a fastener piece projection, the seal portion flange 45 is able to provide a continuous air seal around the perimeter of the wall opening.

The foregoing disclosure and the showing made in the drawings are merely illustrative of the prinicples of this invention and are not to be interpreted in a limiting sense.

I claim:

1. A grommet device for protecting conduit passing through a wall opening, and for providing an air seal between the conduit and the edges of the wall around the wall opening, comprising:
   a. a fastener portion made of relatively stiff material having:
      i. a base portion, said base portion having an opening appropriately sized to allow the passage of said conduit through said base portion opening and to prevent said conduit from contacting the wall at the wall opening,
      ii. a plurality of projections extending outwardly from said base portion and disposed around said base portion opening, and
      iii. locking means at the ends of said projections for locking said grommet device in place relative to said wall opening;

b. a seal portion made of elastomeric material having:
   i. an aperture of slightly less dimensions than the outside dimensions of said conduit, whereby a seal around the perimeter of said conduit is formed when said conduit is passed through said aperture of said seal portion, and
   ii. a plurality of openings appropriately positioned around said seal portion aperture to receive said projections,
   iii. those portions of the seal portion near said seal portion openings having a thickness that is less than the length of said respective fastener portion projections, whereby said locking means protrude beyond those portions of the seal portion near said seal portion openings when said seal portion is assembled onto said fastener portion.

2. The grommet device of claim 1 wherein said projections are of a length such that portions of the wall around said wall opening abut portions of said projections.

3. The grommet device of claim 2 wherein said seal portion further comprises:
   a. a pan having a length at least equal to the length of said projections and having an open end and a partially closed end, said partially closed end of said pan having said aperture, said pan having inside dimensions such that said conduit is prevented from contacting the wall at the wall opening,
   b. a flange extending radially outward from said pan open end, said flange having said plurality of openings for receiving said projections.

4. The grommet device of claim 3 wherein said seal portion openings that receive said projections are only slightly larger than the transverse cross sectional areas of the respective projections.

5. A grommet device for protecting conduit passing through a wall opening, and for providing an air seal between the conduit and the edges of the wall around the wall opening comprising:
   a. a fastener portion made of relatively stiff material having:
      i. a base portion, said base portion having an opening appropriately sized to allow the passage of said conduit through said base portion opening,
      ii. a plurality of projections extending outwardly from said base portion and disposed around said base portion opening, and
      iii. locking means at the ends of said projections for locking said grommet device in place relative to said wall opening;
   b. a seal portion made of elastomeric material having:
      i. a pan, said pan having an open end and a partially closed end, said partially closed end of said pan having an aperture of slightly less dimensions than the outside dimensions of said conduit, whereby a seal around the perimeter of said conduit is formed when said conduit is passed through said aperture of said seal portion, said pan having inside dimensions such that said conduit is prevented from contacting the wall at the wall opening, and
      ii. a plurality of openings appropriately positioned around said seal portion aperture to receive said projections,
      iii. those portions of the seal portion near said seal portion openings having a thickness that is less than the length of said respective fastener piece projections, whereby said locking means protrude beyond those portions of the seal portion near said seal portion openings when said seal portion is assembled onto said fastener portion.

6. The grommet device of claim 5 wherein said projections are of a length such that portions of the wall around said wall opening abut portions of said projections.

7. The grommet device of claim 6 wherein said seal portion further comprises a flange extending radially outward from said pan open end, said flange having said plurality of openings for receiving said projections.

8. The grommet device of claim 7 wherein said seal portion openings that receive said projections are only slightly larger than the transverse cross sectional areas of the respective projections.

* * * * *